Dec. 20, 1932.  S. G. HARWOOD ET AL  1,891,675
WATER SOFTENER
Original Filed March 21, 1925  4 Sheets-Sheet 1

Inventors:
Stanley G. Harwood
Donald Griswold
By Nelson & McCanna
Attys.

Dec. 20, 1932.  S. G. HARWOOD ET AL  1,891,675
WATER SOFTENER
Original Filed March 21, 1925  4 Sheets-Sheet 2

Inventors.
Stanley G. Harwood
Donald Griswold
By Wilson & McCanna
Attys.

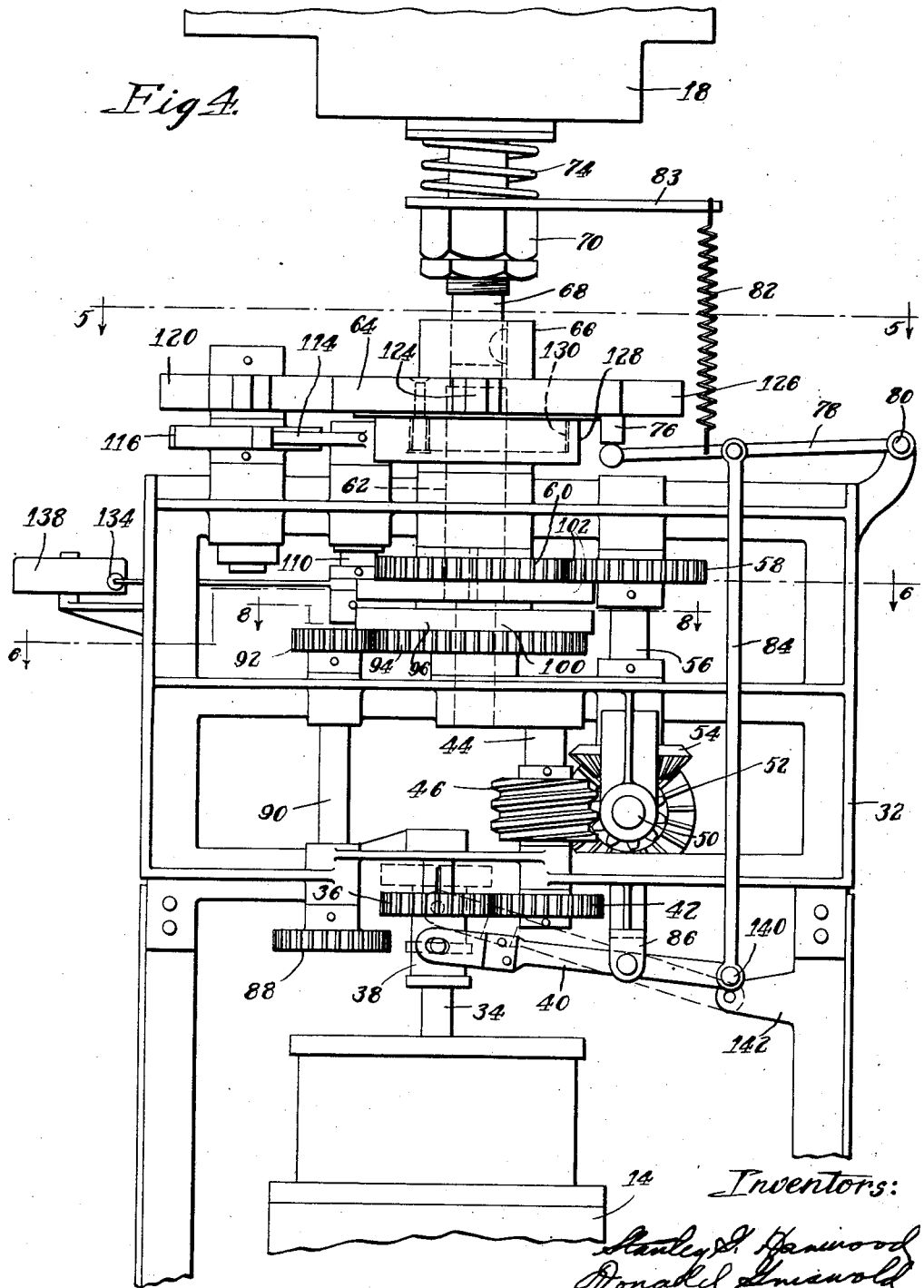

Dec. 20, 1932.   S. G. HARWOOD ET AL   1,891,675
WATER SOFTENER
Original Filed March 21, 1925   4 Sheets-Sheet 4
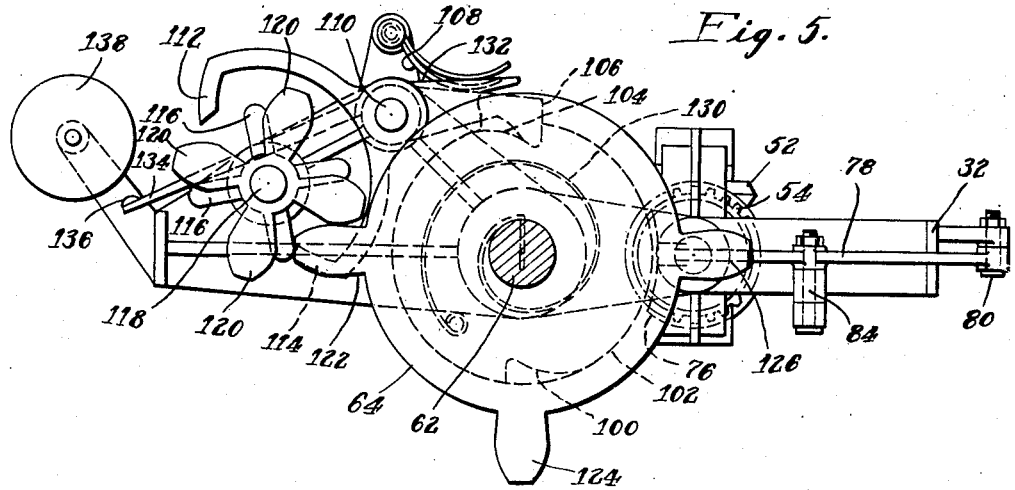
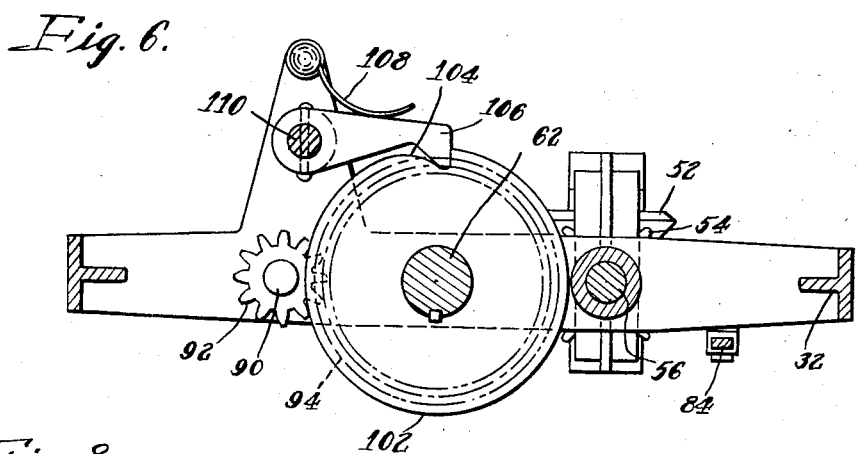
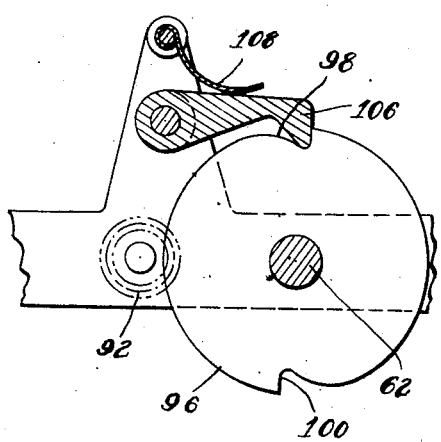
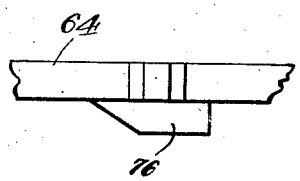

Patented Dec. 20, 1932

1,891,675

UNITED STATES PATENT OFFICE

STANLEY G. HARWOOD AND DONALD GRISWOLD, OF ROCKFORD, ILLINOIS, ASSIGNORS, BY MESNE ASSIGNMENTS, TO THE PERMUTIT COMPANY, OF WILMINGTON, DELAWARE, A CORPORATION OF DELAWARE

WATER SOFTENER

Original application filed March 21, 1925, Serial No. 17,446. Divided and this application filed August 23, 1926. Serial No. 130,806.

This application is a division of our copending application, Serial No. 17,446, filed March 21, 1925.

This invention relates to water softening apparatus operating on the base-exchange principle and is more particularly concerned with a water softener capable of fully automatic or semi-automatic operation.

The principal object of the invention is to provide a water softener controlled automatically or semi-automatically by a mechanism under the control of a meter measuring the flow of water through the softener. The mechanism operates a valve controlling the connections between the water softener tank and the water supply and service systems therefor, and between the softener tank and a regenerating brine tank.

Further objects of the invention are:

First, to provide a water softener having a meter-controlled valve operating mechanism for delivering water thereto from a single source of water supply in predetermined quantities and in predetermined sequence, first to the water softener for the softening operation, thereafter from the same source to a regenerating brine tank to cause the passage of a like volume of brine from the brine tank through the softener, thereafter to pass a predetermined volume of water from the same source through the softener to a waste outlet for rinsing or flushing, and thereafter repeat the operations in the same order.

Second, to provide in a water softener installation comprising a softener tank and brine tank, a single control valve and a valve operating mechanism therefor controlled by a meter inserted in the water supply line, the valve serving to control the communication between the softener tank and the water supply and service systems for softening and between the softener tank and the brine tank for the regenerating operations.

Third, to provide a mechanism of the kind referred to wherein the time of regeneration may be postponed on occasion to suit the convenience of the user so that the regeneration may not occur at an inopportune time.

Fourth, to provide in connection with the time control of regeneration, a suitable signal or alarm operated before regeneration occurs evidencing the fact when the softener has completed its capacity run so that the user is aware that the softener requires regeneration and may or may not delay the regeneration as desired.

Fifth, to provide in a mechanism of the present character, controlling elements in the connection between the meter and the valve whereby the capacity run of the softener is adjusted for different hardnesses of water.

Sixth, to provide in a mechanism of the present character, gear trains of a high and low ratio in the connections between the meter and the valve to handle the regeneration and rinse operations on the one hand and the capacity run on the other hand.

In the accompanying drawings illustrating one embodiment of our invention,

Fig. 4 is a side view of the valve operating mechanism;

Figure 1:
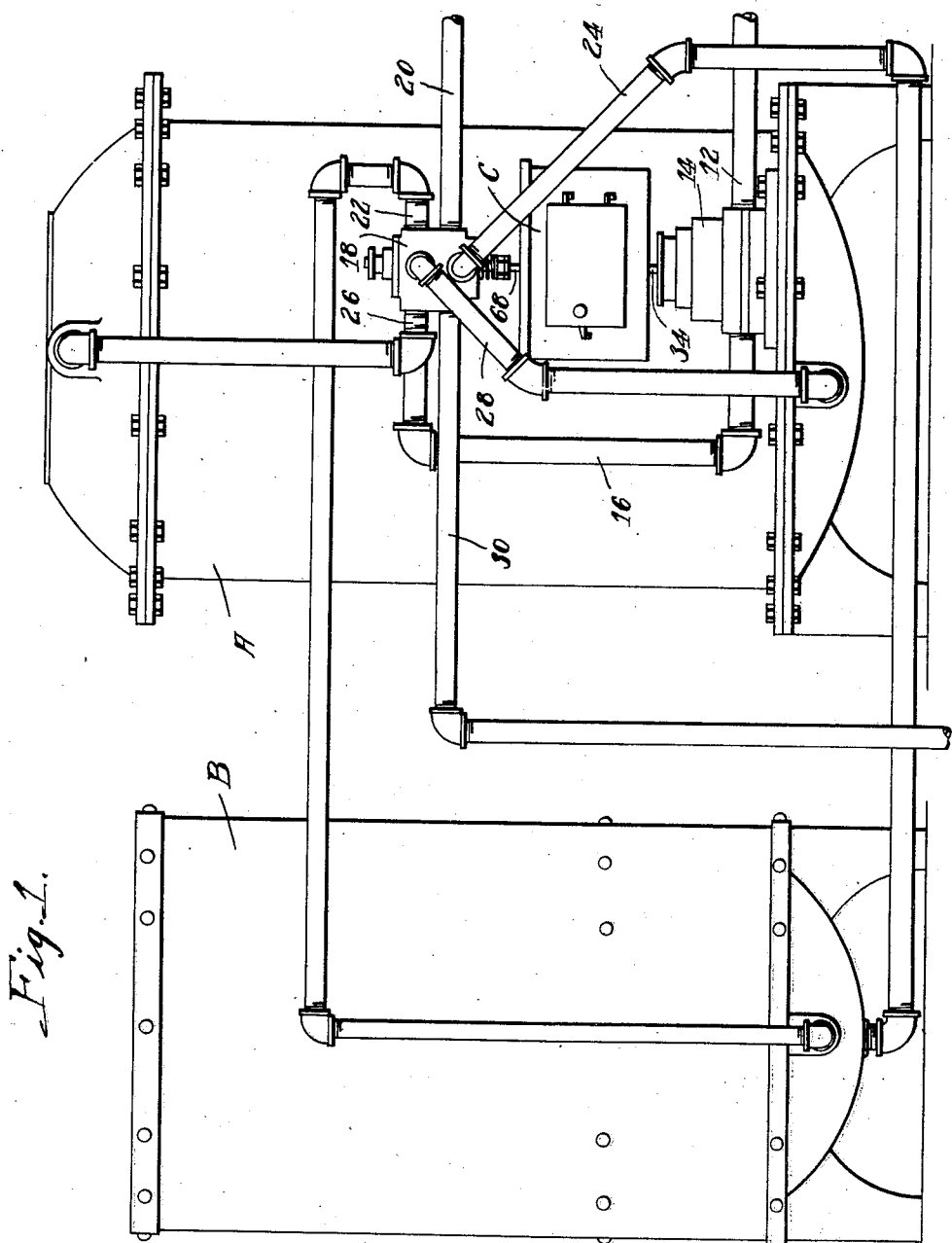
Figure 1 is a view of a complete water softener installation consisting of a softener tank, regenerating brine tank, control valve, and valve operating mechanism.

Figs. 5 and 6 are horizontal sections on the lines 5—5 and 6—6 of Fig. 4;

Fig. 7 is a fragmentary elevational detail of a shifting cam appearing in Fig. 4; and Fig. 8 is a horizontal section taken on the line 8—8 of Fig. 4.

Throughout the views the same reference numerals are applied to corresponding parts.

Figure 2:
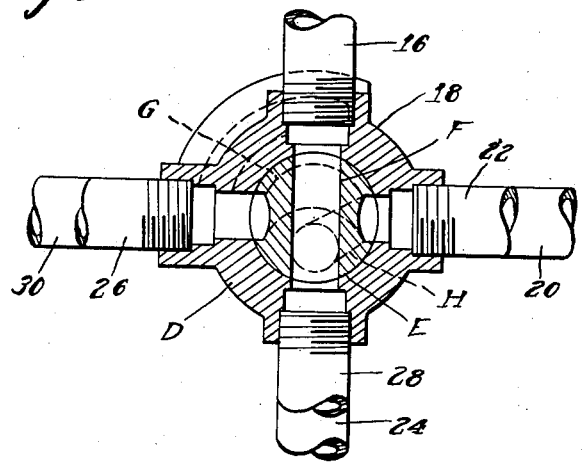
Figs. 2 and 3 are horizontal and vertical sections through the control valve.
Figure 3:
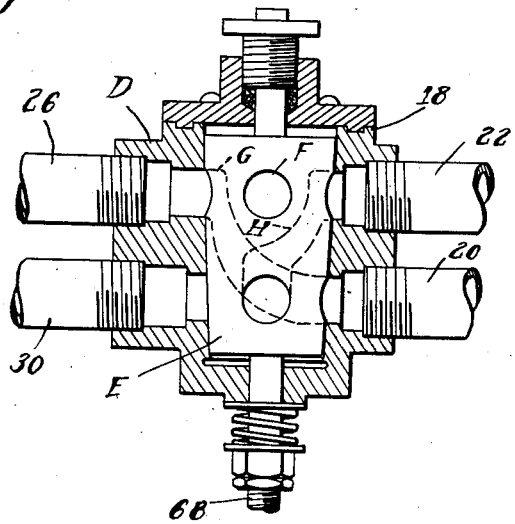

Referring first to Figs. 1 to 3, it will be seen that the water softening apparatus of the present invention includes a valve 18 for controlling the connections between the softener tank A and the water supply and service systems communicating with the pipes 12 and 20 respectively, and also the communication between the softener tank A and a regenerating brine tank B.

The valve is arranged to be shifted to different successive positions by an operating mechanism at C under the control of a meter 14. The valve 18 forms the subject matter of our Patent No. 1,593,300, issued July 20, 1926, and, briefly stated, comprises a casing D and a rotatable plug or core E having a stem 68 rigid therewith and extending from the casing for operation by the mechanism at C. The plug E has three ports therein, F, G, and H, arranged to register with ports in the casing D when the plug is shifted to different positions successively for the softening operation, regenerating operation, and the rinse. The registration of the ports in the plug with the ports in the casing determine the communication between the tank A and the supply and service systems communicating with the pipes 12 and 20, respectively, for the normal softening operation, between the tanks A and B and a waste outlet 30 for the regenerating operation, and between the supply pipe 12, tank A and waste pipe 30 for the rinse operation in a manner fully set forth in the patent above referred to. In the softening operation, the water flows from pipe 12 through the meter 14 and pipe 16 into the valve 18 and through registering ports therein into the pipe 28 leading to the bottom of the softener tank A. Passing upwardly through the mineral in the tank A the water is softened in a manner well known in this art and passes out through pipe 26 into the valve 18, thence, through registering ports in the valve, out through the service pipe 20. In the case of the regenerating operation, when the valve 18 has been shifted, the flow of water is as follows:—From the pipe 12 through meter 14 and pipe 16 into and through the valve 18, and through pipe 24 to the inlet of the brine tank B. This hard fresh water entering the inlet of the brine tank displaces a like volume of brine therefrom which passes out through pipe 22 into and through the valve 18, out through pipe 26 into the top of the softener tank A. Passing downwardly through the mineral in the tank A the brine exchanges its sodium for the calcium and magnesium hardness assimilated by the mineral in a manner well known to the art. The brine leaves the tank through pipe 28 and passes into and through the valve 18 out through the waste pipe 30 to the sewer. Upon the completion of the regeneration the circuit of the water is as follows for the rinse operation:—From the pipe 12 through meter 14 and pipe 16 into valve 18, thence through pipe 28 upwardly through tank A out through pipe 26, valve 18, and out through the waste pipe 30 to the sewer. In passing upwardly through the tank A the hard fresh water is softened by the mineral and displaces whatever quantity of hard water may remain in the tank A in the head space over the mineral as the result of the regeneration operation, or any brine which may be in this space. The system is thus free from hard water or any brine or contaminated water. Subsequent to the rinse operation the valve 18 is again shifted to a position corresponding to the normal softening operation of the apparatus. It will thus appear that the apparatus derives water from the same single source of water supply first for the softening operation, thereafter for the regenerating operation, and finally for the flushing or rinsing operation, the water being supplied in predetermined quantities and in the predetermined sequence just described under the control of the valve 18 which in turn is controlled through the valve operating mechanism by the meter. The details of the valve operating mechanism will now be described. The particular details thereof are covered in the parent application, Serial No. 17,446, filed March 21, 1925. However, the mechanism cooperates in a special manner in the accomplishment of the novel operation above described. To this extent, therefore, namely that of cooperating in a novel combination, the mechanism forms a part of the present invention.

As shown in Figs. 4 to 8, the valve operating mechanism is supported by a suitable frame 32 which carries bearings for various shafts which will be referred to later. The shaft 34 of the meter projects from the top of the casing 14 and a gear 36 having a hub 38 is splined on this shaft, the gear being adapted to be shifted by a lever 40 which will be referred to later. The gear 36 in its position shown in Fig. 4 meshes with a gear 42 secured to the lower end of a vertical shaft 44 to which is secured a worm 46 meshing with a worm gear 48 to provide a reduction gearing. The worm gear 48 is secured to a horizontal shaft 50 to one end of which is secured a bevel gear 52 meshing with a bevel gear 54 secured to the lower end of a vertical shaft 56. To the upper portion of the shaft 56 is secured a gear 58 which meshes with a gear 60 secured to an intermediate portion of a shaft 62 on the upper end of which is loosely mounted a toothed wheel 64 having a hub 66 extending upwardly beyond the end of this shaft. The valve in the casing 18, as stated above, has a downwardly extending stem 68 which is splined in the hub 66 as shown. The stem 68 is provided with lock nuts 70 and a coiled spring 74 surrounds the stem 68 between the lock nuts and the bottom of the valve casing 18 so that the valve is urged resiliently downwardly in the casing. If the valve wears, the lock nuts may be turned upwardly so that the valve will be held firmly to its seat, the splined connection of the stem 68 with the hub 66 permitting the valve to contact with its seat regardless of wear. The under surface of the wheel 64 carries a cam 76 having a considerable dwell as shown in side elevation in Fig. 7. In the position of the wheel 64, shown in Fig. 4, the cam 76 engages and depresses the free end of a lever 78 which is pivoted to the frame at 80. A spring 82 attached to this lever and to a bar 83 which may be supported in any suitable manner serves to hold the free end of the lever upwardly when not engaged by the cam as will be apparent from the drawings. A link 84 connects the lever 78 with the outer end of the lever 40 previously referred to, the lever 40 being intermediately pivoted at 86 to a projection carried by the frame.

When the inner end of the lever 78 is permitted to move upwardly, the gear 36 is slid downwardly being thereby disengaged from the gear 42 and brought into mesh with a gear 88 secured to the lower end of a vertical shaft 90 to the upper end of which is secured a gear 92 which meshes with a gear 94 mounted freely on the lower end of the shaft 62. Secured to the upper surface of the gear 94 is a disk 96 having two inclined notches 98 and 100 formed at diametrically opposite places on its periphery as shown in Fig. 8, the inclination of the notches being rearwardly directed. Above the disk 96 is a disk 102 secured to the lower surface of the gear 60 so as to rotate therewith. The disk 102 is provided with a single inclined notch 104 formed in its periphery as shown in Fig. 6 with the inclination rearwardly directed. A pawl 106 pressed by a spring 108 engages the peripheries of both of the disks 96 and 102 although preferably only the lower portion of the periphery of the disk 102 is thus engaged. This pawl is secured to the lower end of a vertical rod 110 to the upper end of which is secured an escapement arm having pallets 112 and 114 on its respective ends adapted to engage in succession with four arms 116 arranged 90 degrees from each other around a vertical rod 118. Above the arms 116, a star wheel is secured to the rod 118, this star wheel having four points or teeth 120 which during the operation of the escapement are successively engaged by three teeth 122, 124 and 126 carried on the periphery of the toothed wheel 64 previously referred to. The teeth 122 and 124 and also the teeth 124 and 126 are spaced 90 degrees from each other while the teeth 122 and 126 are 180 degrees from each other with no intervening tooth on one side of the wheel. By referring to Fig. 4, it will be observed that a spring motor casing 128 is secured to the under surface of the toothed wheel 64. This casing contains a spiral spring 130 whose inner end is secured to the shaft 62 and whose outer end is secured to the motor casing. This spring will therefore be wound when the gear 36 is in mesh with the gear 42 and the meter is running.

We preferably provide a signal to announce the fact that the regenerating operation is shortly to commence; during which period it will be understood that water is cut off from the service pipe. One form in which the signal may be embodied will be understood from Figs. 4 and 5. A spring pressed pawl 132 is loosely mounted on the rod 110 just above the attached pawl 106. The pawl 132 is shorter than the pawl 106 and its point rides in contact with the upper portion of the periphery of the disk 102 while the pawl 106 rides in contact with the periphery of the lower disk 96 and the lower portion only of the periphery of the upper disk 102. Extending out from the pawl 132 is an arm 134 carrying a hammer 136 adapted to strike a bell 138 when the pawl 132 drops quickly into the notch 104 which it will do shortly before the pawl 106 drops into this notch and also into the notch 98 of the lower disk 96. The lever 40 is connected to the lower end of the link 84 by a removable pin 140 which may be taken out and then replaced in the opening in the lever and in an opening in a lug 142 carried by the frame. When this is done, the gear 36 is moved up into the dotted position shown in Fig. 4.

The operation is doubtlessly clear from the foregoing description. In the initial position of the parts as shown in Figs. 4 and 5 the toothed wheel 64 is held stationary by the escapement device and the upper disk 102 turned slowly clockwise during the periods when water is drawn and the meter runs. When the disk 102 has nearly completed one rotation the short pawl 132 whose point is in advance of the point of the pawl 106 drops into the potch 104 and the hammer 136 is caused to strike the bell 138 as a warning that the water will soon be cut off from the service pipe. The foregoing operations are purely automatic. If the regeneration is to be carried on automatically the valve will be shifted from the softening position to the regenerating position as soon as the capacity run is completed. Then after the proper amount of brine has been passed through the softener tank, as determined by the amount of water measured by the meter 14, the valve will be shifted from the regeneration position to the rinse position. A measured amount of fresh water is then allowed to pass through; being measured by the meter 14. After the rinse operation the valve is shifted back to its normal softening position and the apparatus recommences its cycle of operation. The apparatus may, however, be made to operate semi-automatically, that is, the time of regeneration may be postponed to suit the convenience of the operator. If, for any reason, it is not convenient to cut off the water within the next few minutes after the alarm is given, the pin 140 which connects the lever 40 with the link 84 may be removed and used to hold the end of the lever 40 in the dotted line position shown in Fig. 4 by passing the pin through an opening in the lug 142. The link 84 in that case is left hanging free. It is not, of course, intended that this condition shall be maintained for any great length of time since the softener would not continue to function properly for a much longer period without regeneration. As soon as the special condition making it desirable to obtain water from the service pipe is over the pin 140 is restored to its normal position joining the link 84 with the lever 40. The disk 102 is then again connected for rotation and as soon as it has made a complete rotation the pawl 106 drops into the notch 104 and the first tooth 122 of the wheel 64 is allowed to escape on account of the shifting of the escapement device. The spring 130 then causes the wheel 64 and the valve to complete a quarter turn. The second tooth 124 is then unable to get past the escapement. In this new position of the valve, water is shut off from the service pipe and is caused to flow through the regenerating brine tank and thence through the softener. That is, brine displaced by the water entering the regenerating brine tank is caused to flow through the softener. The water supplied to the brine tank is metered the same as the water supplied to the softener during the softening operation. While the wheel 64 is completing its first quarter turn, the cam 76 is moved sufficiently to release the lever 78 so that the gear 36 is shifted under the action of the spring 82 into mesh with the gear 88. The lower disk 96 thus commences to turn but at a much faster speed than the upper disk 102 is turned. Soon after the disk 96 starts to turn the pawl 106 is lifted out of the notch 98 and the escapement is reset to its former position. When the disk 96 has completed one-half turn the pawl 106 drops into the notch 100 and the wheel 64, under the tension exerted by the spring motor, makes another quarter turn and is stopped in a new position with the third tooth 126 unable to get past the escapement. The valve by this operation has been given another quarter turn and has been brought into its third position in which water from the supply pipe goes through the softener to rinse or wash out the brine into the waste pipe. This water is also metered the same as the water supplied to the softener during the softening operation. Soon after the disk 96 starts the last half of its rotation, the pawl 106 is lifted out of the notch 100 and the escapement is reset. When the disk 96 has completed a rotation the pawl 106 again drops into the notch 98 and the wheel 64 completes a half turn which brings it, together with the valve, into initial position so that the cycle of operation may be gone through again. It is to be noted that the worm gearing serves not only as a reduction gearing but as a lock for the spring motor to prevent reverse movement even when the gear 36 is disengaged from the gear 42. It will also be noted that the amount of water which may be drawn from the service pipe before the regenerating operation starts may be readily varied by changing the gear ratio of the gears 58 and 60. The amount of water that passes through the softener before regeneration may, therefore, be varied according to the degree of hardness of the water. A change in the ratio of the gears 58 and 60 will not affect the duration of the regenerating and rinse operations since these operations are controlled through gears in the high ratio gear train which operates independently of the gears 58 and 60.

We claim:

1. In a water softening apparatus, the combination with a softener tank, and a brine tank, having a single source of water supply from which water is supplied to the softener in softening and again to the softener and brine tank in regeneration, of valve mechanism serving to control the circulation in the apparatus for the periods of softening and regeneration, a meter serving to measure the water passing through the apparatus, and means under control of the meter for automatically operating said valve mechanism after a predetermined amount of water has passed through the meter in softening, and for automatically operating the said mechanism again after a different amount of water has passed through the meter in regeneration, said operating means comprising valve-actuating means and controlling means therefor including means driven by the meter during the flow for softening and other means driven by the meter during the flow other than for softening, the first valve operation being controlled by the meter through said first named means driven thereby and the second valve operation being controlled by the meter through the second named means driven thereby.

2. A water softening apparatus as set forth in claim 1 wherein the valve mechanism is arranged for three distinct operations in each cycle, the initial operation occuring after a certain predetermined amount of water has passed through the meter in softening, the second operation occurring after another different amount of water has passed through the meter in regeneration, and the third operation occurring after still another amount of water has passed through the meter in rinsing, said third named operation being controlled by the meter through said second named means driven thereby.

3. A water softening apparatus comprising a softening tank having water supply and service systems arranged to communicate therewith, a regenerating brine tank and waste outlet also arranged to communicate therewith, a valve mechanism for controlling the connections between said softener and the water supply and service systems or between the softener and said regenerator, said valve mechanism comprising a single control valve adapted to be set successively in different positions, the first position establishing communication from the water supply system through the softener with the service system, and the next position establishing communication between the water supply system, the brine tank and the softener and between the latter and the waste outlet, a meter, and a meter controlled mechanism for shifting said valve from the first to the second position, and finally back to the first position.

4. In a water softening apparatus, the combination with a softener tank and a brine tank having a single source of water supply from which water is supplied to the softener in softening and again to the softener and brine tank in regeneration, of valve mechanism serving to control the circulation in the apparatus for the periods of softening and regeneration, a meter for measuring the water passing through the apparatus, means under the control of the meter arranged to be operated automatically after a predetermined amount of water has passed through the meter in softening so as to indicate the necessity for operating the valve mechanism, means under control of the meter arranged to be operated after the operation of the indicating means for automatically operating said valve mechanism to cause the regeneration and restoration of the softener to softening operation, and means whereby the operator may temporarily derange the mechanism pursuant to such indication to defer the regeneration.

5. In an automatic water softening apparatus, a bed of water softening material, a single source of water supply, a waste outlet, a brine reservoir, a meter, and meter-controlled valve means associated with the aforementioned elements normally establishing communication between the single source of water supply and the bed of softening material for passage of water therethrough for softening, said valve means being automatically operable when regeneration is to occur to establish communication for the same source of water supply with the brine reservoir and for the latter with the bed of softening material whereby to cause brine to be passed through the bed of softening material to revive the same and thence to the waste outlet, and said valve means being thereafter automatically operable to establish communication for the same source of water supply with the bed of softening material to cause water to be passed through the bed to flush the same and thence to the waste outlet, said valve means being thereafter automatically operable to resume the normal system of communication between the source of water supply and the bed of softening material for the normal softening operation as first above described.

6. In a water softening apparatus, the combination with a bed of water softening material, a single source of water supply, a waste outlet for the bed of softening material, and a brine reservoir, of a meter and meter-controlled mechanism associated with the aforementioned elements whereby to produce automatic operation of the apparatus by automatically completing communications between two or more of the elements as follows: first, between the single source of water supply and the bed of water softening material to cause water to pass through the bed for softening in the normal operation of the apparatus, second, between the same source of water supply and the brine reservoir, from the latter to the bed of softening material, and from the bed to the waste outlet whereby to cause brine to be passed through the bed and thence to the waste outlet in the regenerating operation of the apparatus, and third, between the same source of water supply and the bed of water softening material and between the latter and the waste outlet whereby to cause water to pass through the bed and thence to the waste outlet for the flushing operation of the apparatus, the said mechanism thereafter reestablishing the communication as first above described for the normal softening operation of the apparatus.

7. A water softening apparatus comprising a softener containing water softening material, a single water supply source therefor, a regenerating brine tank for said softener, a waste outlet for said softener, a meter arranged to measure the fluid flow through said softener, and meter-controlled mechanism for controlling the communication between said supply source, water softener, brine tank and waste outlet for delivering water from said single supply source in predetermined quantities and in predetermined sequence first to the softener for softening, thereafter to the regenerating tank and thence to the softener for regenerating the same and thence to the waste outlet, and thereafter to repeat the operations in the same order.

8. A water softening apparatus capable of complete automatic operation without manual intervention comprising a softener containing water softening material, a regenerating tank having valved communication therewith, a waste outlet having valved communication therewith, a single water supply source having valved communication interchangeably with said softener directly, or indirectly therewith through said regenerating brine tank, and means, comprising a meter for measuring the fluid flow through said softener and a mechanism controlled by said meter in turn controlling the valved communications hereinabove mentioned, for delivering water from the single supply source in predetermined quantities and in a predetermined sequence, first to the softener directly for softening and from thence to the usual service system, thereafter to the brine tank and thence to the softener for regenerating, and thereafter repeating the above operations in the order named.

9. A water softening apparatus comprising a softener containing water softening material, a single water supply source therefor, a meter for measuring the flow of water through said softener, a regenerator and waste outlet for said softener, valve mechanism for controlling the connections between a service system served by the softener, the single water supply source, regenerator, and waste outlet, and a mechanism controlled by said meter for operating said valve mechanism whereby water in predetermined quantities and in predetermined sequence is delivered from said single water supply source first to the softener for softening and thence to the service system, thereafter to the regenerator to cause the passage of a like volume of brine therefrom through said softener for regeneration thereof and from thence to the waste outlet, and thereafter to repeat the cycle of operations in the same order.

In witness of the foregoing we affix our signatures.

STANLEY G. HARWOOD.
DONALD GRISWOLD.